United States Patent
Jakobsson et al.

(10) Patent No.: US 10,985,790 B2
(45) Date of Patent: Apr. 20, 2021

(54) MULTI-ANTENNA COMMUNICATION DATA-CONVERTER CLOCKING

(71) Applicant: Telefonaktiebolaget LM Ericsson (publ), Stockholm (SE)

(72) Inventors: Peter Jakobsson, Lund (SE); Magnus Nilsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/646,703

(22) PCT Filed: Sep. 15, 2017

(86) PCT No.: PCT/EP2017/073334
§ 371 (c)(1),
(2) Date: Mar. 12, 2020

(87) PCT Pub. No.: WO2019/052659
PCT Pub. Date: Mar. 21, 2019

(65) Prior Publication Data
US 2020/0274561 A1 Aug. 27, 2020

(51) Int. Cl.
*H04B 1/04* (2006.01)
*H04B 7/0413* (2017.01)
(Continued)

(52) U.S. Cl.
CPC ......... *H04B 1/0483* (2013.01); *H04B 7/0413* (2013.01); *H04B 7/0617* (2013.01); *H04L 7/0331* (2013.01)

(58) Field of Classification Search
CPC .. H04B 1/0483; H04B 7/0413; H04B 7/0617; H04L 7/0331
See application file for complete search history.

(56) References Cited

U.S. PATENT DOCUMENTS 6,243,412 B1 6/2001 Fukawa
7,079,869 B2 7/2006 Kytur et al.
(Continued)

FOREIGN PATENT DOCUMENTS

CN 104770030 A 7/2015
EP 2299774 A1 3/2011
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Base Station (BS) Radio Transmission and Reception (Release 12)", Technical Specification, 3GPP TS 36.104 V12.9.0, Sep. 1, 2015, pp. 1-155, 3GPP.
(Continued)

*Primary Examiner* — Freshteh N Aghdam
(74) *Attorney, Agent, or Firm* — Coats + Bennett, PLLC (57) ABSTRACT

A communication circuit (20) for communication via multiple antenna elements ($10_j$) of a communication apparatus (2) is disclosed. The communication circuit (20) comprises a plurality of communication units ($30_j$) configured to communicate simultaneously in the same frequency band. Each communication unit ($30_j$) of said plurality of communication units ($30_j$) is arranged to be connected to a separate antenna element ($10_j$) and comprises a data converter (90, 120). The data converters (90, 120) of the plurality of communication units ($30_j$) together form a set of data converters. Furthermore, the communication circuit (20) comprises a clock-signal generation circuit (50) configured to generate a distinct sampling clock signal at a distinct sampling clock frequency ($f_{sj}$) to each data converter (90, 120) in the set of data converters.

13 Claims, 4 Drawing Sheets

(51) Int. Cl.
*H04B 7/06* (2006.01)
*H04L 7/033* (2006.01)

(56) References Cited

U.S. PATENT DOCUMENTS

| | | | |
|---|---|---|---|
| 10,193,603 B2* | 1/2019 | O'Keeffe | H04B 17/12 |
| 2002/0080728 A1* | 6/2002 | Sugar | H04B 1/0003 |
| | | | 370/252 |
| 2006/0014513 A1 | 1/2006 | Uozumi et al. | |
| 2011/0044313 A1 | 2/2011 | Jeong et al. | |
| 2012/0076229 A1 | 3/2012 | Brobston et al. | |
| 2012/0076241 A1* | 3/2012 | Rajendran | H04B 7/0871 |
| | | | 375/308 |
| 2012/0224646 A1 | 9/2012 | Purohit et al. | |
| 2013/0051284 A1 | 2/2013 | Khlat | |
| 2013/0188755 A1 | 7/2013 | Lu et al. | |
| 2013/0188756 A1 | 7/2013 | Sundstrom et al. | |
| 2013/0196673 A1* | 8/2013 | Smadi | H04W 56/001 |
| | | | 455/450 |
| 2014/0259853 A1 | 9/2014 | Crispin | |
| 2014/0269853 A1 | 9/2014 | Gudem et al. | |
| 2015/0003436 A1* | 1/2015 | Shapira | H04B 1/48 |
| | | | 370/338 |
| 2015/0123873 A1 | 5/2015 | Perumana et al. | |
| 2015/0237626 A1 | 8/2015 | Li et al. | |
| 2016/0285617 A1* | 9/2016 | Van der Goes | H04B 1/001 |
| 2016/0337677 A1 | 11/2016 | Lee | |
| 2017/0195054 A1* | 7/2017 | Ashrafi | H04B 10/532 |
| 2018/0083816 A1* | 3/2018 | Bolstad | H01Q 21/0025 |
| 2019/0089448 A1 | 3/2019 | Jakobsson | |
| 2019/0097662 A1* | 3/2019 | Hornbuckle | H04L 27/0002 |

FOREIGN PATENT DOCUMENTS

| | | |
|---|---|---|
| KR | 20090114336 A | 11/2009 |
| KR | 20130130064 A | 11/2013 |
| WO | 2011002790 A1 | 1/2011 |

OTHER PUBLICATIONS

Huang, X. et al., "Sample Rate Conversion with Parallel Processing for High Speed Multiband OFDM Systems", 2013 IEEE Wireless Communications and Networking Conference (WCNC): PHY, Apr. 7, 2013, pp. 2754-2759, IEEE.

* cited by examiner

MULTI-ANTENNA COMMUNICATION DATA-CONVERTER CLOCKING

TECHNICAL FIELD

The present disclosure relates to clocking of data converters, in particular in multi-antenna communication apparatuses.

BACKGROUND

Fifth generation (5G) cellular systems will initially be deployed on higher frequencies and with higher carrier bandwidths, then existing state of the art cellular systems, such as fourth generation (4G) cellular systems. One development in cellular communications, leading towards the development of 5G systems, is an increase of the number of antenna elements used especially in base stations. An increase in antenna elements is likely for user equipment (UE) as well. This increase in the number of antenna elements enables efficient multiple-input multiple-output (MIMO) and beamforming schemes to be used. 5G systems are, at least initially, foreseen to be deployed on higher frequencies and with higher carrier bandwidths, than, for instance, 4G cellular systems. The use of an active antenna system (AAS) with multiple antenna elements help overcome the increased path loss between the base station and UE due to the higher frequency. For example, an antenna array with 64 antenna elements can give signal-to-noise ratio (SNR) gain of $10 \log_{10}(64)=18$ dB, compared with using a single antenna.

Hence, the increased number of antenna elements provides advantages. However, it also poses challenges in terms of hardware design. A straightforward design approach is to use equally configured transmit and receive paths for all antenna elements, which provides for a simple and modular design.

SUMMARY

The inventors have realized that data converters, i.e. digital-to-analog converters (DACs) or analog-to-digital converters (ADCs), in the different transceivers connected to the different antenna elements can advantageously be clocked with sampling clock signals having different sampling clock frequencies. For DACs, advantages of this scheme can e.g. include that the spectral repetitions of a signal to be transmitted appear at different frequencies for different DACs. Hence, for the AAS system as a whole, the power of such spectral repetitions is spread out over a larger frequency range, compared with if all DACs used the same sampling clock frequency. For ADCs, advantages of this scheme can include that aliases of a blocker located outside of the Nyquist bands of the ADCs appear at different frequencies in the output signals from the ADCs for different ADCs. Consequently, for the AAS system as a whole, the power of such aliases appears spread out over a larger frequency range compared with if all ADCs used the same sampling clock frequency.

According to a first aspect, there is provided a communication circuit for communication via multiple antenna elements of a communication apparatus. The communication circuit comprises a plurality of communication units configured to communicate simultaneously in the same frequency band. Each communication unit of said plurality of communication units is arranged to be connected to a separate antenna element and comprises a data converter. The data converters of the plurality of communication units together form a set of data converters. Furthermore, the communication circuit comprises a clock-signal generation circuit configured to generate a distinct sampling clock signal at a distinct sampling clock frequency to each data converter in the set of data converters.

In some embodiments, the data converters in the set of data converters are digital-to-analog converters (DACs) located in transmit paths of said communication units.

The clock-signal generation circuit may be configured to, when the communication units are to transmit signals having a certain frequency bandwidth, in the following referred to as carrier bandwidth (CBW), generate the distinct sampling clock signals such that the difference in sampling clock frequency between any two of the distinct sampling clock signals is a non-zero integer multiple of the CBW.

The clock-signal generation circuit may be configured to, when the communication units are to transmit signals having a certain frequency bandwidth, again referred to as CBW, generate the distinct sampling clock signals such that the difference in sampling clock frequency between any two of the distinct sampling clock signals is a non-zero integer multiple of half the CBW.

In some embodiments, each communication unit is configured to receive a digital representation of a signal to be transmitted at a common sampling frequency, common to all communication units, and comprises a sample-rate converter configured to convert said digital representation of the signal to be transmitted to the distinct sampling frequency of the distinct sampling clock signal of the DAC in the transmit path of the communication unit.

In some embodiments, the data converters in the set of data converters are analog-to-digital converters (ADCs) located in receive paths of said communication units.

In some embodiments, each communication unit is configured to output a digital representation of a received signal at a common sampling frequency, common to all communication units, and comprises a sample-rate converter configured to convert an output of the ADC in the receive path of the communication circuit to the common sampling frequency.

In some embodiments, the clock-signal generation circuit comprises a plurality of phase-locked loop circuits, each configured to generate one of said distinct sampling clock signals.

According to a second aspect, there is provided a communication apparatus comprising the communication circuit of the first aspect.

The communication apparatus may, for instance, be a wireless communication device for a cellular communications system, a base station for a cellular communications system, or an access point for a wireless local-area network. However, other types of communication apparatuses are possible as well.

In some embodiments, the communication apparatus is configured to operate as an AAS.

Further embodiments are defined in the dependent claims. It should be emphasized that the term "comprises/comprising" when used in this specification is taken to specify the presence of stated features, integers, steps, or components, but does not preclude the presence or addition of one or more other features, integers, steps, components, or groups thereof.

DETAILED DESCRIPTION

Figure 1:
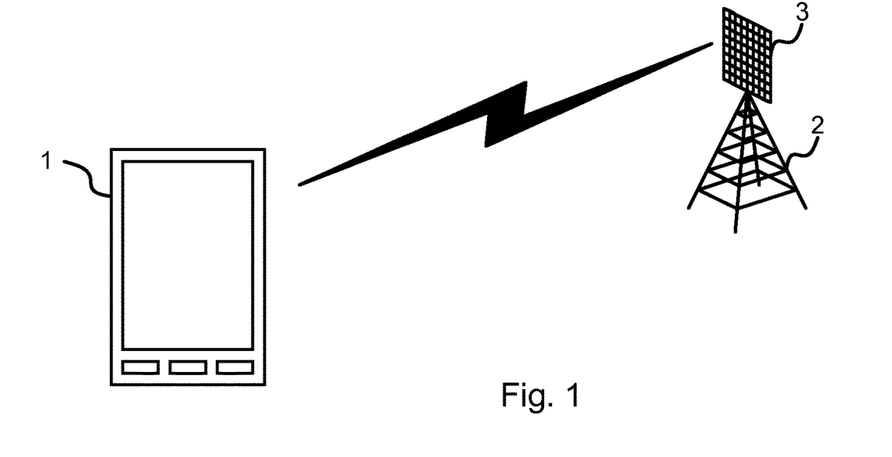
FIG. 1 illustrates a communication environment.

FIG. 1 illustrates a communication environment wherein embodiments of the present invention may be employed. A wireless communication device 1, or wireless device 1 for short, of a cellular communications system is in wireless communication with a radio base station 2, or base station 2 for short, of the cellular communications system. The wireless device 1 may be what is generally referred to as a user equipment (UE). The wireless device 1 is depicted in FIG. 1 as a mobile phone, but may be any kind of device with cellular communication capabilities, such as a tablet or laptop computer, machine-type communication (MTC) device, or similar. Furthermore, a cellular communications system is used as an example throughout this disclosure. However, embodiments of the present invention may be applicable in other types of systems as well, such as WiFi systems.

The radio base station 2 and wireless device 1 are examples of what in this disclosure is are generically referred to as communication apparatuses. Embodiments are described below in the context of a communication apparatus in the form of the radio base station 2 or wireless device 1. However, other types of communication apparatuses can be considered as well, such as a WiFi access point or WiFi enabled device.

According to the example shown in FIG. 1, the radio base station 2 is equipped with an antenna module 3, such as an antenna array, comprising a plurality of antenna elements. The radio base station 2 may, for instance, be configured to operate as an active antenna system, or AAS, as discussed in the background. The radio base station 2 may be configured to transmit signals in the same transmit frequency band via all antenna elements using the same transmit frequency. Alternatively or additionally, the radio base station 2 may be configured to receive signals in the same receive frequency band via all antenna elements using the same receive frequency. In some embodiments, said receive frequency is equal to said transmit frequency. In other embodiments, said receive frequency is different from said transmit frequency. Examples of such multi-antenna communication in the same frequency band for all antenna elements include multiple-input multiple-output (MIMO) communication, massive MIMO, multi-user MIMO (MU-MIMO), and beamforming. This is notably different from communication that uses different frequency bands for different antenna elements, for instance so called carrier aggregation. Even though not explicitly shown in FIG. 1, the wireless device 1 may also comprise such a multi-antenna arrangement.

Figure 2:
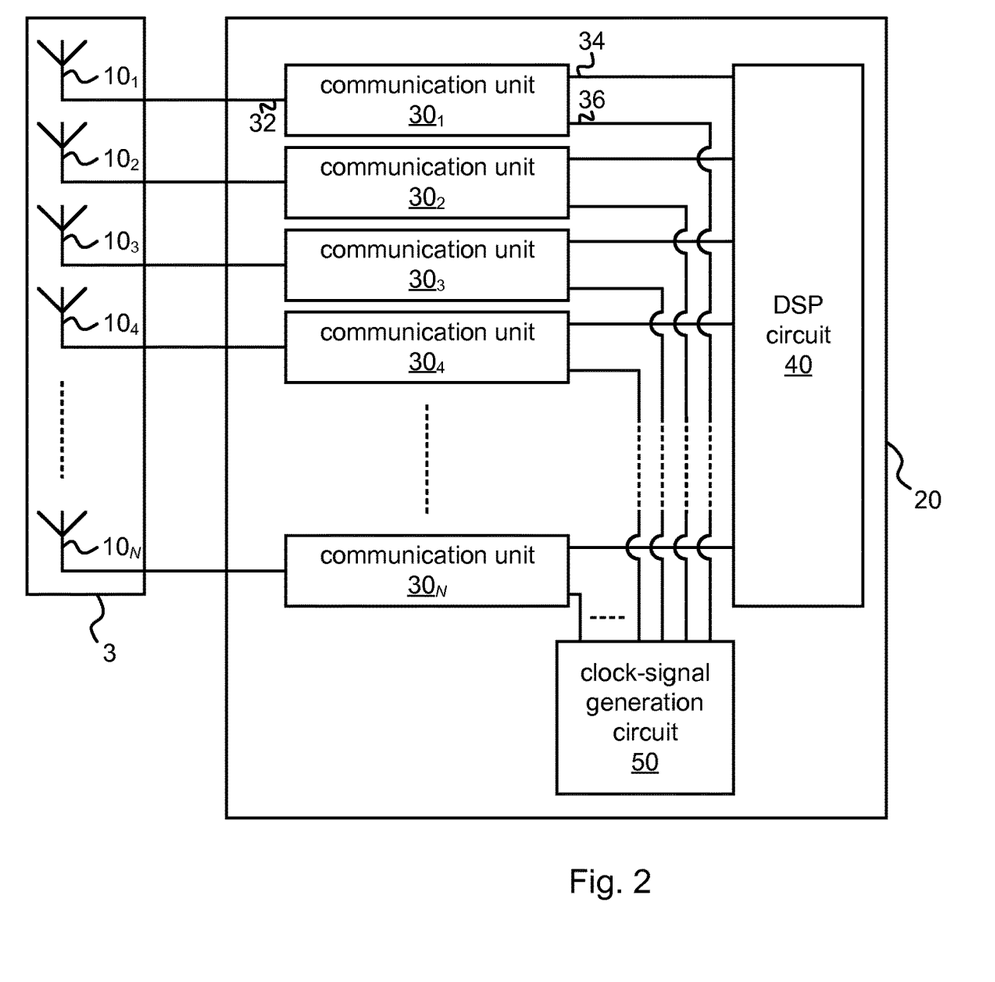
FIGS. 2-3 are block diagrams.

FIG. 2 illustrates a block diagram of an embodiment of a communication circuit 20 that can be comprised in a communication apparatus. Throughout this description, the radio base station 2 is used as a non-limiting example of a communication apparatus in which the communication circuit 20 is comprised. FIG. 2 also includes multiple antenna elements $10_j$ of the communication apparatus. In FIG. 2, these are shown as being part of the antenna module 3 of the radio base station 2.

According to embodiments, the communication circuit 20 is configured to communicate via the multiple antenna elements $10_1$-$10_N$. It comprises a plurality of communication units $30_1$-$30_N$ configured to communicate simultaneously in the same frequency band (e.g. transmit in the same transmit frequency band or receive in the same receive frequency band, as discussed above). The communication units $30_1$-$30_N$ may be transmitters, receivers, or transceivers. Each communication unit $30_j$ of said plurality of communication units $30_1$-$30_N$ is arranged to be connected to a separate antenna element $10_j$. In this description, the same index j is used for the communication unit $30_j$ and the antenna element $10_j$ to which it is connected. Thus, communication unit $30_1$ is connected to antenna element $10_1$, communication unit $30_2$ is connected to antenna element $10_2$, etc.

As illustrated in FIG. 2, the communication circuit 20 may comprise a digital signal processing (DSP) circuit 40 connected to the communication units 301-30N. The DSP circuit 40 may e.g. be what is generally referred to as a baseband processor. The DSP circuit may be configured to perform tasks such as modulation, demodulation, coding, decoding, MIMO processing, and/or beamforming processing.

The communication circuit 20 further comprises a clock-signal generation circuit 50 configured to generate sampling-clock signals, as is further described below.

In FIG. 2, reference sign 32 is used as a label of a connection port of communication unit $30_1$ for connection to the antenna element $10_1$. Similarly, in FIG. 2 reference sign 34 is used as a label of a connection port of communication unit 301 for connection to the DSP circuit 40. Furthermore, in FIG. 2 reference sign 36 is used as a label of a connection port of communication unit $30_1$ for connection to the clock-signal generation circuit 50. For readability, these reference signs are only shown for the communication unit $30_1$. However, although not explicitly shown, each communication unit $30_j$ has such connection ports. It should be noted that the term "connection port" does not necessarily imply any specific type physical connector, but may e.g. be an electrical node within an integrated circuit.

Figure 3:
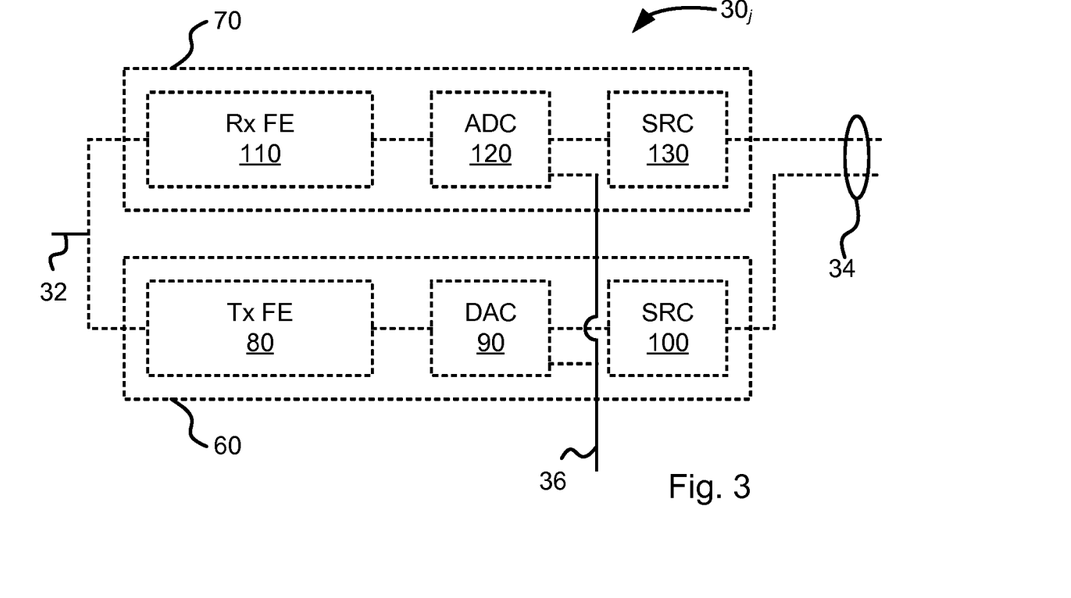

FIG. 3 is a block diagram illustrating embodiments of the communication unit $30_j$. All of the communication units $30_1$-$30_N$ may be implemented in the same way. As illustrated in FIG. 3, the communication unit 30 may comprise a transmit path 60 and/or a receive path 70.

According to some embodiments the transmit path 60 comprises a transmitter frontend (Tx FE) circuit 80, configured to be connected to antenna element $10_j$ via connection port 32. The Tx FE circuit 80 may, for instance, comprise circuitry such as filters, mixers, power amplifiers, and the like. The design of Tx FE circuits, in general, is well known and not discussed in any further detail herein. Furthermore, the transmit path 60 comprises a digital-to-analog converter (DAC) 90. The DAC 90 may be configured to convert a digital signal, to be transmitted, into an analog representation suitable for input to the Tx FE circuit 80. The digital signal to be transmitted may e.g. originate from the DSP circuit 40 (FIG. 2). The DAC 90 is configured to receive a sampling clock signal from the clock-signal generation circuit 50.

According to some embodiments the receive path 70 comprises a receiver frontend (Rx FE) circuit 110, configured to be connected to antenna element $10_j$ via connection port 32. The Rx FE circuit 110 may, for instance, comprise circuitry such as filters, mixers, low-noise amplifiers, and the like. The design of Rx FE circuits, in general, is well known and not discussed in any further detail herein. Furthermore, the receive path 70 comprises an analog-to-digital converter (ADC) 120. The ADC 120 may be configured to convert an analog signal, received via the Rx FE circuit 110, into a digital representation suitable for further digital signal processing. Such further digital signal processing may e.g. be performed, at least in part, by the DSP circuit 40 (FIG. 2).

In an AAS system, such further processing can e.g. include generating a weighted combination of signals from different communication units $30_j$, in order to obtain an overall receiver with spatial selectivity, such as a beamforming receiver. The ADC 120 is configured to receive a sampling clock signal from the clock-signal generation circuit 50.

A common term used for DACs and ADCs is data converter. Hence, regardless of whether the communication unit $30_j$ comprises the transmit path 60, the receive path 70, or both, the communication unit $30_j$ does comprise a data converter (either DAC 90 or ADC 120). Furthermore, the clock-signal generation circuit 50 is configured to generate a sampling-clock signal to that data converter 90, 120. The communication units $30_1$-$30_N$ together form a set of communication units. Furthermore, the aforementioned data converters in that set of communication units $30_1$-$30_N$ together form a set of data converters.

A straightforward approach would be to operate all data converters in the set of data converters at the same sampling clock frequency. However, the inventors have realized that there are benefits of operating each data converter in the set of data converters at a distinct sampling clock frequency, different from the sampling clock frequency of the other data converters in the set of data converters. Hence, according to some embodiments, the clock-signal generation circuit 50 is configured to generate a distinct sampling clock signal at a distinct sampling clock frequency to each data converter 90, 120 in the set of data converters.

Embodiments are described below where the communication circuit 20 comprises a single such set of data converters. However, other embodiments may include multiple sets of data converters operated according to the same principles. Even though each data converter in a given set of data converters operate at a distinct sampling clock frequency, different from the other data converters in the same set, two data converters from different sets may well operate at the same sampling clock frequency. For instance, each communication unit $30_j$ may comprise several data converters operated at the same sampling clock frequency, where each of the data converters within that same communication unit $30_j$ is considered to belong to a different set. For example, in some embodiments, each of the communication units $30_1$-$30_N$ comprises both the transmit path 60 and the receive path 70. The DAC 90 and the ADC 120 of a given communication unit $30_j$ may be configured to operate on the same sampling clock frequency. In that case, the DACs 90 of the communication units $30_1$-$30_N$ may form one set of data converters, and the ADCs 120 of the communication units $30_1$-$30_N$ may form another set of data converters. In some embodiments, each communication unit $30_j$ may comprise separate data converters for in-phase (I) and quadrature-phase (Q) channels operating on the same sampling clock frequency, but belonging to different sets. In some embodiments, the communication circuit 20 may comprise multiple sets of communication units, i.e. may comprise one or more additional sets of communication units in addition to the set of communication units $30_1$-$30_N$. Data converters from different sets of communication units may, in such embodiments, belong to different sets of data converters. For example, if the antenna module 3 comprises a very high number (say several tens to hundreds) of antenna elements, it may be inconvenient to generate sampling clock signals of that same very high number of different sampling clock frequencies. For example, it may result in an excessively wide range of sampling clock frequencies (i.e. difference between the highest and the lowest sampling clock frequency). In such cases, it may be a beneficial trade-off to partition the communication units into multiple sets, where data converters from different sets of communication units are allowed to operate on the same sampling clock frequency, thereby reducing the required range of sampling clock frequencies to be generated.

Figure 4:
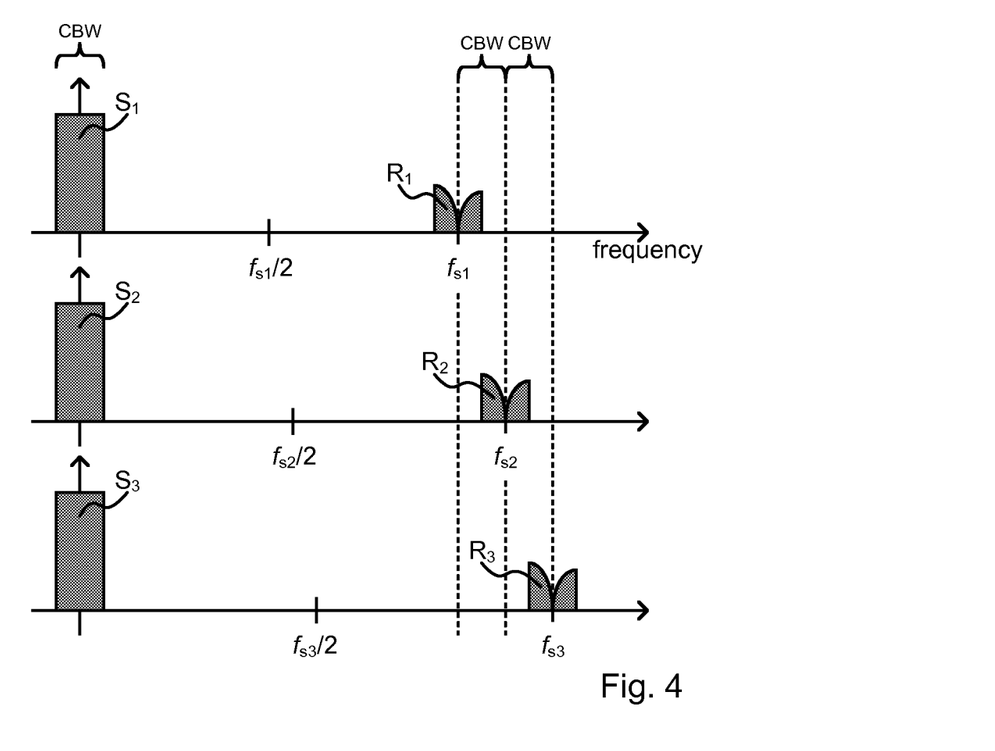
FIGS. 4-6 illustrate signal spectra.
Figure 5:
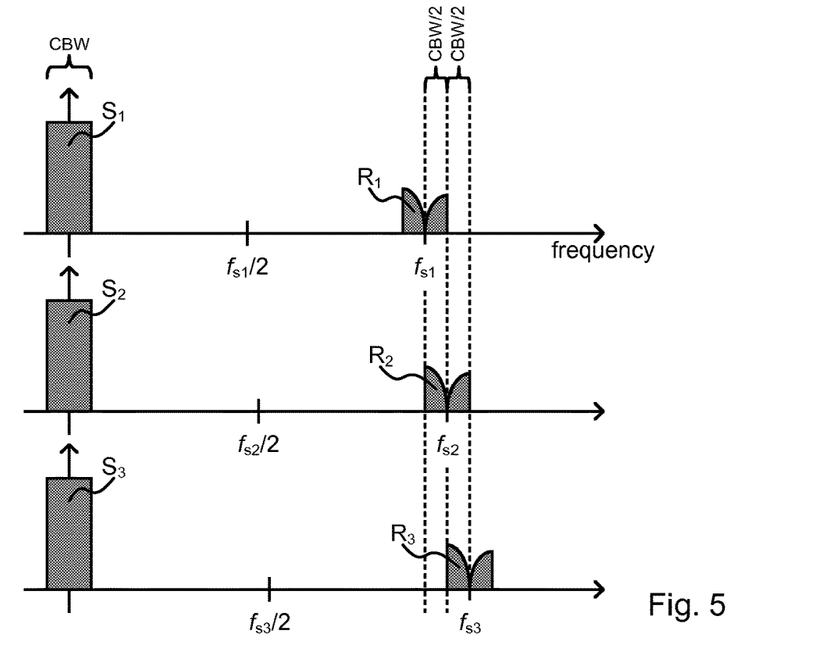

FIGS. 4-5 illustrate examples for embodiments where the data converters are DACs. The figures illustrate output spectra (i.e. in the frequency domain) from three different DACs. The communication units $30_1$-$30_N$ are, in these examples, operated to transmit signals having a certain frequency bandwidth, in the following referred to as carrier bandwidth (CBW). These signals are represented with a shaded box $S_j$ around 0 Hz in the plots in FIGS. 4 and 5. As is well known, the output spectrum of a DAC also includes repetitions of the desired signal, weighted with a sinc function (in the case of a DAC with piecewise constant output between sampling instants), around integer multiples of the sampling clock frequency. The first of these (i.e. where the integer multiple is 1) is included in the plots in FIGS. 4-5, and labeled $R_j$. In the overall output of the antenna module 3, these spectral repetitions $R_j$ will typically result in unwanted out-of-band spectral emissions. It should be noted that there are often regulatory restrictions on the allowed amount of such out-of-band emissions in order not to disturb other communication systems in the surroundings. Furthermore, the sampling clock frequencies of the different DACs are denoted $f_{sj}$, where the index "s" denotes sampling and the index "j" is an integer that indicates which DAC it relates to (it may for example relate to the DAC 90 of the communication unit $30_j$ with the same index j). In the figures, the outputs from three different DACs are shown, and thus there are three different values of j shown, namely 1, 2, and 3. A skilled person would readily understand how to extend the situations shown to cases with more than three different DACs.

Consider first, as a reference example, a case where all sampling clock frequencies $f_{sj}$ are equal. In that case, the spectral repetitions $R_j$ in the outputs from different DACs would coincide in frequency. In the overall output from the antenna module 3, these spectral repetitions $R_j$ will, at least in some spatial directions, constructively interfere with each other and result in excessive out-of-band emissions that require relatively steep filters within the communication units $30_1$-$30_N$ (e.g. in the Tx FE circuits 80) to comply with regulatory requirements.

FIG. 4 illustrates an embodiment where the difference in sampling clock frequency $f_{sj}$ between any two of the distinct sampling clock signals is a non-zero integer multiple of the carrier bandwidth CBW. Using the indexing of FIG. 4, the sampling-clock frequencies are given by $$f_{sj} = f_{s1} + (j-1)CBW \qquad (1)$$

For this embodiment, it can be seen that there is no overlap in frequency between the first spectral repetitions $R_j$ from the different DACs. Thus, these are not constructively interfering with each other and the maximum power spectral density is kept relatively low. Another way of phrasing this is that the power of such spectral repetitions $R_j$ is spread out over a larger frequency range, compared with if all DACs used the same sampling clock frequency. This can, for instance, relax the filtering requirements in the communication units $30_1$-$30_N$.

FIG. 5 illustrates another embodiment where the difference in sampling clock frequency $f_{sj}$ between any two of the distinct sampling clock signals is a non-zero integer multiple of half the carrier bandwidth CBW/2. Using the indexing of FIG. 4, the sampling-clock frequencies are given by $$f_{sj} = f_{s1} + (j-1)\frac{CBW}{2} \quad (1)$$

For this embodiment, the first spectral repetitions $R_j$ (between some DACs) overlap in frequency with half the CBW. Hence, there is some degree of constructive interference between spectral repetitions $R_j$ from different DACs. However, it should be noted that the sinc function has a zero at the sampling frequency. Thus, as illustrated in FIG. 5, the power spectral densities of the spectral repetitions $R_j$ typically have their maximum values at their edges and a minimum value (ideally zero) in their centers. As can be seen in FIG. 5, the edge of the first spectral repetition $R_j$ in the output of one DAC coincides (in frequency) with the center of the first spectral repetition $R_{j+1}$ or $R_{j-1}$ in the output of another DAC. Thereby, the resulting overall out-of-band power spectral density can be kept relatively low despite the partial overlap of the spectral repetitions $R_j$ in the frequency domain. Although the power of the spectral repetitions $R_j$ is spread out over a smaller frequency range than for the embodiment illustrated in FIG. 4, it is still spread out over a larger frequency range than the reference example where all DACs used the same sampling clock frequency. An advantage of the embodiment illustrated in FIG. 5, compared with the embodiment illustrated in FIG. 4, is that a smaller range of different sampling clock frequencies is needed. Thus, there is a trade-off between the range of different sampling clock frequencies needed and how efficiently the power of the spectral repetitions $R_j$ from the DACs can be spread out in frequency.

Figure 6:
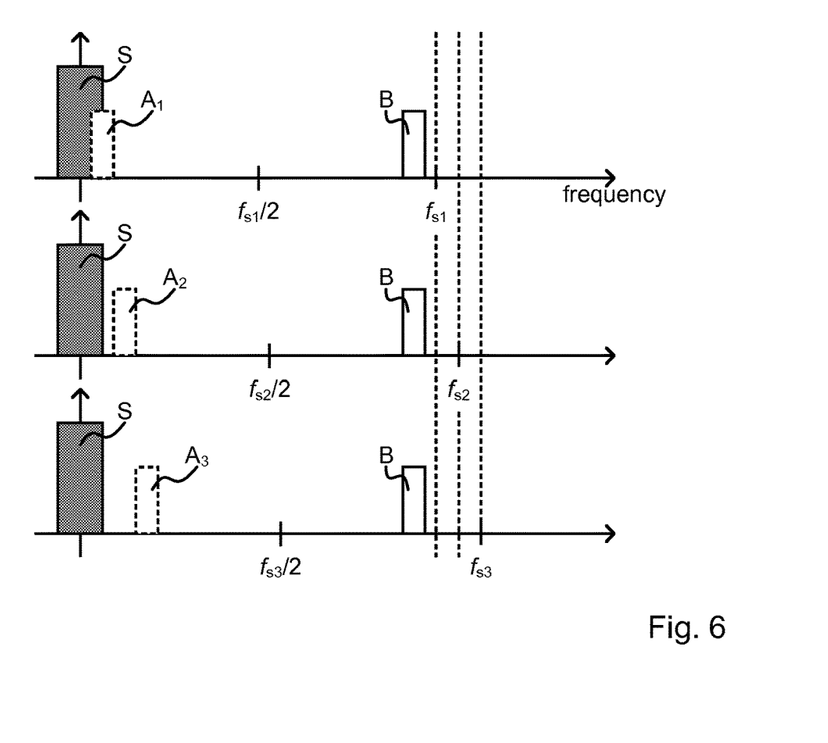

FIG. 6 illustrates an example for embodiments where the data converters are ADCs. The communication units $30_1$-$30_N$ are, in these examples, operated to receive a signal represented with a shaded box S around 0 Hz in the plots in FIG. 6. As is well known, the output spectrum, within the Nyquist band, of an ADC also includes aliases of undesired signals that originates from outside the Nyquist band. The plots in FIG. 6 includes, as an example, an undesired blocking signal labeled B. Also shown, with dashed boxes, are the location of the aliases (labeled $A_j$) of this blocking signal for different sampling clock frequencies. Similar to FIGS. 4-5, the sampling clock frequencies of the different ADCs are denoted $f_{sj}$, where the index "s" denotes sampling and the index "j" is an integer that indicates which ADC it relates to (it may for example relate to the ADC 120 of the communication unit $30_j$ with the same index j). In the figures, spectra for three different ADCs are shown, and thus there are three different values of j shown, namely 1, 2, and 3. A skilled person would readily understand how to extend the situations shown to cases with more than three different ADCs.

Consider first, as a reference example, a case where all sampling clock frequencies $f_{sj}$ are equal. In that case, the spectral repetitions aliases $A_j$ of the blocking signal B in the outputs from different ADCs would coincide in frequency. In the combined output from these ADCs, these aliases $A_j$ will, at least in some spatial directions, constructively interfere with each other and may deteriorate the desired signal, especially if the aliases $A_j$ overlap in frequency with the desired signal S. This, in turn, may require relatively steep anti-aliasing filters within the communication units $30_1$-$30_N$ (e.g. in the Rx FE circuits 110) to suppress such blocking signals.

In FIG. 6, it is illustrated that when the sampling clock frequencies $f_{sj}$ are different, the aliases do not coincide in frequency. For ADCs, advantages of this scheme can include that aliases of a blocker located outside of the Nyquist bands of the ADCs appear at different frequencies in the output signals from the ADCs for different ADCs. Consequently, for the AAS system as a whole, the power of such aliases $A_j$ appears is spread out over a larger frequency range compared with if all ADCs used the same sampling clock frequency.

Under some radio conditions, one or more blocking signals may be present, the aliases of which coincides or overlaps with the desired signal for one or more of the communication units $30_1$-$30_N$, but not for others. According to some embodiments, the communication circuit 20 may be configured to exclude the signals from the communication units $30_j$ for which such an alias of a blocking signal coincides or overlaps with the desired signal when combining the signals from the communication units.

According to some embodiments, the communication units $30_1$-$30_N$ comprise sample-rate converters (SRCs) to enable that the communication units $30_1$-$30_N$ transfer digital signals (for instance to or from the DSP circuit 40) at a common sampling frequency, although the data converters of different communication units $30_1$-$30_N$ operate at different sampling clock frequencies.

For example, according to some embodiments, each communication unit $30_j$ is configured to receive a digital representation of a signal to be transmitted at a common sampling frequency, common to all communication units $30_1$-$30_N$. Furthermore, each communication unit $30_j$ comprises an SRC 100 (see FIG. 3) configured to convert said digital representation of the signal to be transmitted to the distinct sampling frequency of the distinct sampling clock signal of the DAC 90 in the transmit path 60 of the communication unit $30_j$.

As another example, according to some embodiments, each communication unit $30_j$ is configured to output a digital representation of a received signal at a common sampling frequency, common to all communication units $30_1$-$30_N$. Furthermore, each communication unit $30_j$ comprises an SRC 130 (see FIG. 3) configured to convert an output of the ADC 120 in the receive path of the communication circuit to the common sampling frequency.

The design of SRCs, per se, is well known and not discussed herein in any further detail.

Figure 7:
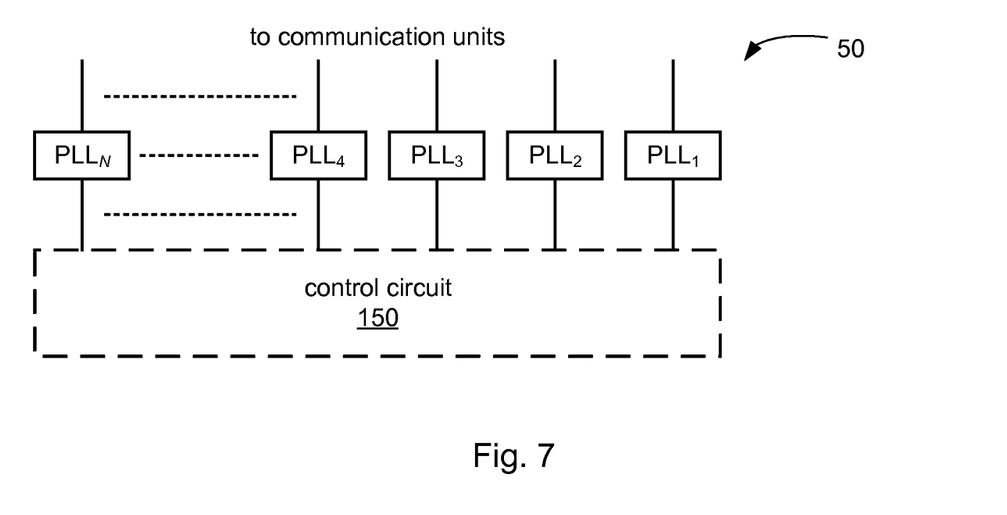
FIG. 7 is a block diagram.

According to some embodiments, the clock-signal generation circuit 50 comprises a plurality of phase-locked loop (PLL) circuits, each configured to generate one of said distinct sampling clock signals. An embodiment is illustrated in FIG. 7, wherein the clock-signal generation circuit 50 comprises PLL circuits $PLL_1$-$PLL_N$. The PLL circuit $PLL_j$ is configured to generate the sampling clock signal to the data converter in the communication unit $30_j$. Furthermore, as illustrated in FIG. 7, the clock-signal generation circuit 50 may comprise a control circuit 150 configured to control the sampling clock frequencies of the sampling clock signals generated by the PLL circuits $PLL_1$-$PLL_N$. This can, for instance, be done by controlling divisors of frequency dividers within the PLL circuits $PLL_1$-$PLL_N$. Frequency control of PLL circuits is well known and not discussed herein in any further detail. It should be noted that, in some embodiments, the control of the sampling clock frequencies may be performed by circuitry outside the clock-signal generation circuit 50, for instance by the DSP circuit 40. It should also be noted that the block diagram in FIG. 2 does not necessarily represent a physical layout of the communication circuit 20. For instance, in some embodiments, the clock-signal generation circuit 50 is physically distributed such that the PLL circuit $PLL_j$ is located in relatively close proximity to the communication unit $30_j$.

The sampling clock signals are normally not the only clock signals in the communication units $30_1$-$30_N$. For example, in some embodiments, there is also a radio-frequency (RF) local oscillator (LO) signal for upconverting signals to be transmitted to an RF carrier frequency and/or downconverting a received signal from an RF carrier frequency. In practice, it is not possible to perfectly isolate the sampling clock signals from the RF LO signals. Hence, there will be some degree of intermodulation between these signals, resulting in intermodulation products that will leak through the antenna module 3 and contribute to the out-of-band emission mentioned above. By using different sampling clock frequencies in different communication units $30_j$, these intermodulation products end up at different frequencies for different communication units $30_j$. Hence, the overall out-of-band emission is spread out in frequency similar to the spectral repetitions discussed above, which in turn simplifies complying with regulatory requirements.

The disclosure above refers to specific embodiments. However, other embodiments than the above described are possible within the scope of the invention. The different features and functions of the embodiments may be combined in other combinations than those described.

The invention claimed is:

1. A communication circuit configured to communicate via multiple antenna elements of a communication apparatus, the communication circuit comprising:
 a plurality of transceiver communication circuits configured to communicate simultaneously in the same frequency band, wherein each transceiver communication circuit of the plurality of transceiver communication circuits is arranged to be connected to a separate antenna element and comprises data converters, wherein corresponding data converters of the plurality of transceiver communication circuits together form a set of data converters; and
 a clock-signal generation circuit configured to generate a different sampling clock signal at a different sampling clock frequency to each data converter in the set of data converters.

2. The communication circuit of claim 1, wherein the data converters in the set of data converters are digital-to-analog converters located in transmit paths of the transceiver communication circuits.

3. The communication circuit of claim 2, wherein the clock-signal generation circuit is configured to, when the transceiver communication circuits are to transmit signals having a certain carrier bandwidth, generate the different sampling clock signals such that a difference in sampling clock frequency between any two of the different sampling clock signals is a non-zero integer multiple of the carrier bandwidth.

4. The communication circuit of claim 2, wherein the clock-signal generation circuit is configured to, when the transceiver communication circuits are to transmit signals having a certain carrier bandwidth, generate the different sampling clock signals such that a difference in sampling clock frequency between any two of the different sampling clock signals is a non-zero integer multiple of one half the carrier bandwidth.

5. The communication circuit of claim 2, wherein each transceiver communication circuit is configured to receive a digital representation of a signal to be transmitted at a common sampling frequency, common to all the plurality of transceiver communication circuits, and comprises a sample-rate converter configured to convert the digital representation of the signal to be transmitted to a different sampling frequency of the different sampling clock signal of the digital-to-analog coverter in the transmit path of the transceiver communication circuit.

6. The communication circuit of claim 1, wherein the data converters in the set of data converters are analog-to-digital converters located in receive paths of the transceiver communication circuits.

7. The communication circuit of claim 6, wherein each of the plurality of transceiver communication circuits is configured to output a digital representation of a received signal at a common sampling frequency, common to all transceiver communication circuits, and comprises a sample-rate converter configured to convert an output of the ADC in the receive path of the communication circuit to the common sampling frequency.

8. The communication circuit of claim 1, wherein the clock-signal generation circuit comprises a plurality of phase-locked loop circuits, each phase-locked loop circuit configured to generate one of the different sampling clock signals.

9. A communication apparatus, comprising
 a communication circuit configured to communicate via multiple antenna elements of the communication apparatus, the communication circuit comprising:
  a plurality of transceiver communication circuits configured to communicate simultaneously in the same frequency band, wherein each transceiver communication circuit of the plurality of transceiver communication circuits is arranged to be connected to a separate antenna element and comprises data converters, wherein corresponding data converters of the plurality of transceiver communication circuits together form a set of data converters; and
  a clock-signal generation circuit configured to generate a different sampling clock signal at a different sampling clock frequency to each data converter in the set of data converters.

10. The communication apparatus of claim 9, wherein the communication apparatus is a wireless communication device for a cellular communications system.

11. The communication apparatus of claim 9, wherein the communication apparatus is a base station for a cellular communications system.

12. The communication apparatus of claim 9, wherein the communication apparatus is an access point for a wireless local-area network.

13. The communication apparatus of claim 9, wherein the communication apparatus is configured to operate as an active antenna system.

* * * * *